April 7, 1925.

W. C. TAGGART

LIQUID DISPENSING DEVICE

Filed June 4, 1924

1,532,609

William C. Taggart Inventor

By Geo. B. Willcop
Attorney

Patented Apr. 7, 1925.

1,532,609

UNITED STATES PATENT OFFICE.

WILLIAM C. TAGGART, OF BIG RAPIDS, MICHIGAN.

LIQUID-DISPENSING DEVICE.

Application filed June 4, 1924. Serial No. 717,771.

*To all whom it may concern:*

Be it known that I, WILLIAM C. TAGGART, a citizen of the United States, residing at Big Rapids, in the county of Mecosta and State of Michigan, have invented certain new and useful Improvements in Liquid-Dispensing Devices; and I do hereby declare the following to be a full, clear, and exact description of the invention, such as will enable others skilled in the art to which it appertains to make and use the same.

This invention relates to liquid dispensing devices and pertains more particularly to an apparatus especially adapted and designed for dispensing liquid substances such as ethyl lead along with gasoline at gasoline filling stations.

As is well known it is becoming the common practice to add a few cubic centimeters of ethyl lead or similar liquid per gallon of gasoline for use in automobile and areoplane engines, and for other uses.

The objects of my improvement are to provide a simple and inexpensive, yet strong and durable dispensing device that can be operated by the station attendant in the presence of the purchaser so as to deliver into the filling hose a predetermined amount of the solution before the gasoline is pumped.

My dispensing device is arranged to enable the customer to see the operation of the machine and also to see the liquid and observe the amount that is measured out for his use before the liquid is delivered from the dispensing device into the gasoline hose.

After the desired quantity of liquid has been seen by the customer, measured and delivered into the hose, the connection between the dispensing device and the hose is closed to prevent back-flow of gasoline from the hose into the dispensing device when the gasoline is pumped into the storage tank of the vehicle.

With the foregoing and certain other objects in view which will appear later in the specifications, my invention comprises the devices herein described and claimed and the equivalents thereof.

In the drawings Fig. 1 is a side view of the device attached to a filling station pump.

Figure 1:
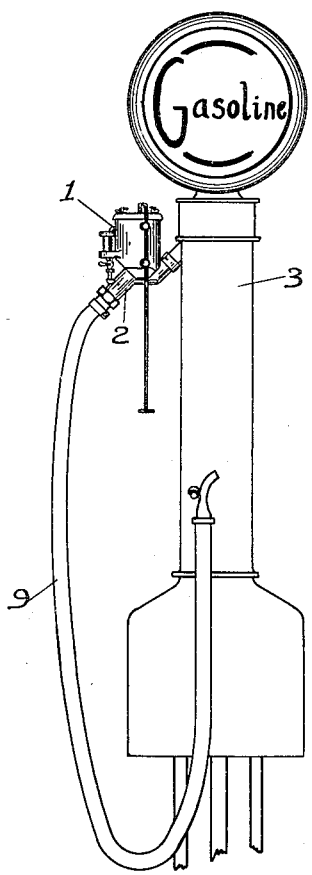

As is clearly shown in the drawings, the device consists in a container or tank 1 supported upon a pipe 2 which may be inserted as a part of the gasoline hose line through which the gasoline flows from the pump 3 to the customer's tank.

Preferably the container 1 and the pipe 2 are formed integral, being made of a single casting, but the interior of the container or tank is not in communication with the interior of the pipe. Inside the tank and near its top is an inclined spout 4 and above the spout inside the tank is located a projecting rod or finger 5. The lower end of the spout terminates in a pipe 6 leading to a glass-walled receptacle 7 carried by the tank 1.

The bottom of receptacle 7 is provided with an outlet valve 8 that communicates with the interior of pipe 2. The glass walled receptacle 7 is large enough to hold a unit supply of liquid which flows into it from the spout 4 and the receptacle 7 being of glass, the supply is visible to the customer.

When valve 8 is opened the contents of receptacle 7 flows into the pipe 2 and thence into the filling hose 9.

Figure 2:
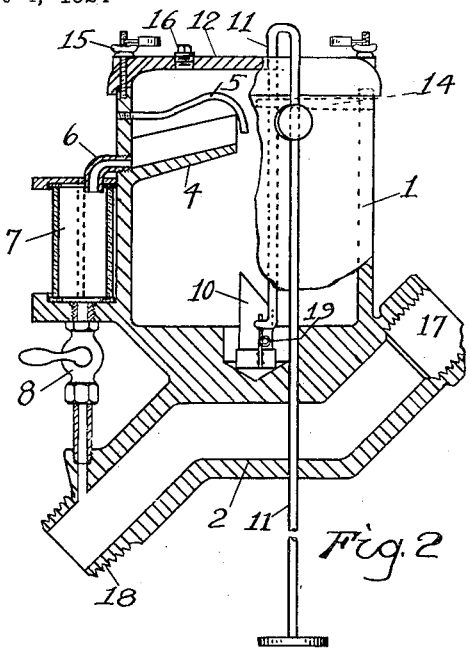
Fig. 2 is a part sectional view of the device.
Figure 3:
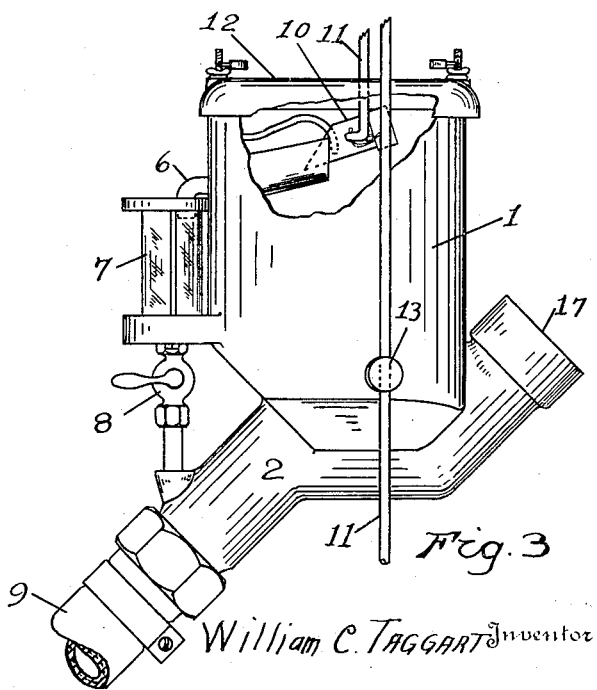
Fig. 3 is a side elevation, partly broken away, showing the measuring cup in its discharge position.

To deliver a predetermined quantity of liquid into spout 4 I provide a measuring cup 10 vertically movable from the bottom of tank 1 to the spout 4, as shown in Figs. 2 and 3.

The cup 10 is tiltable on a vertically slidable rod 11 that projects through the cover 12 and extends down. The rod 11 is bent upwardly and outwardly and extends down along the outside of the tank 1, as shown in Fig. 3, the rod being guided in suitable guideways 13 and having a knob or button at its lower end by which the rod and the tiltable cup 10 can be manipulated.

Inside the tank 1 I prefer to provide a bracket 14 to guide the rod and slidingly support it near the mouth of the spout 4.

When the rod 11 is lifted cup 10, filled with liquid, rises until its end engages finger 5. The cup then tilts and empties into the spout 4, as shown in Fig. 3 and as indicated by dotted lines in Fig. 4. When the rod 11 is released the cup returns to the bottom of the tank and is again filled, ready for the next measurement.

The cover 12 may be fastened to the tank 1 in any suitable manner, as by the means of bolts and wing nuts 15, and may be provided with a filling plug 16.

Figure 4:
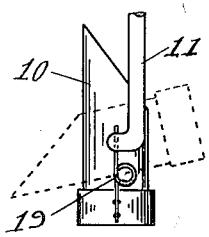
Fig. 4 is a side view of the measuring cup.

The ends of the pipe 2 are threaded, as at 17 and 18, for attachment to the pump 3 and to the filling hose 9 respectively, so that the pipe 2 when installed, becomes an integral part of the hose line, but is not directly in communication with the interior of tank 1. The cup 10 is preferably provided with a spring 19 fixed at one end to the body of the cup and having a bend or loop in its middle part, the other end of the spring passing slidingly through an opening in rod 11, as shown in Fig. 4, so that the spring maintains the cup 10 normally in its upright position, and when the cup has been tilted, as shown by the dotted lines in Fig. 4, the spring will automatically return it to its vertical position.

By the means above described I have produced a simple and inexpensive device for dispensing liquids into the hose lines of filling station pumps.

If no mixture is required by the customer, gasoline only will be supplied through the pipe 2 as usual, but if it is desired to add a small measured quantity of another fluid to the gasoline, the operator, in sight of the customer, lifts rod 11, thereby delivering a unit supply of the liquid into the transparent receptacle 7, so that the customer sees the exact quantity to be delivered to him. Then by opening valve 8, the measured quantity is discharged into the gasoline hose, after which the valve 8 is closed to prevent back flow of gasoline and then the pump 3 is operated in the usual manner.

The gasoline supply is thoroughly mixed with the measured quantity of other liquid while the gasoline is being pumped through the hose into the customer's tank.

Having thus described my invention, what I claim and desire to secure by Letters Patent is:

1. A pipe section to be inserted in the delivery line of a service station pump, a tank integral with said pipe and an imperforate wall between said tank and said pipe, a spout in said tank near its upper part, a visual-contents receptacle in communication at its top with said spout and having at its bottom a conduit communicating with said pipe section, and a shut-off valve in said conduit, a liftable measuring cup in said tank, and means adapted to lift said cup and tilting means adapted to empty said cup into said trough.

2. A pipe section to be inserted in the delivery line of a service station pump, a tank integral with said pipe and an imperforate wall between said tank and said pipe, a spout in said tank near its upper part, a visual-contents receptacle in communication at its top with said spout and having at its bottom a conduit communicating with said pipe section and a shut-off valve in said conduit, a measuring cup in said tank and actuating means for said cup adapted to alternately fill it and empty it into said trough.

In testimony whereof, I affix my signature.

WILLIAM C. TAGGART.

Witnesses:
 STANLEY C. NELSON,
 R. M. HOLLAND.